Aug. 25, 1970  J. F. BLUM  3,525,894
SPARK PLUG WITH A CONDUCTIVE GLASS SEAL ELECTRODE OF GLASS
AND A METAL ALLOY
Filed June 26, 1968
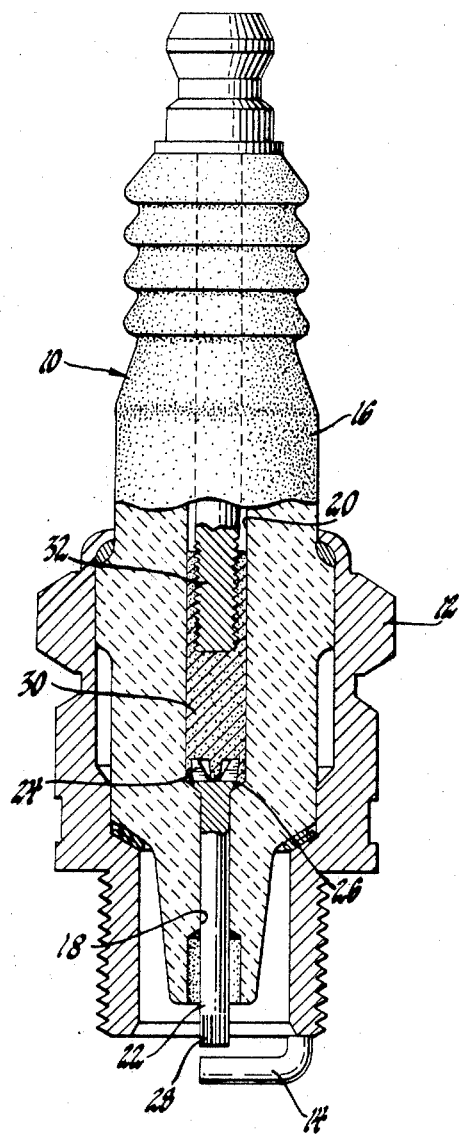
INVENTOR.
Jack F. Blum
BY
Joseph E. Kieninger
ATTORNEY United States Patent Office 3,525,894
Patented Aug. 25, 1970

3,525,894
SPARK PLUG WITH A CONDUCTIVE GLASS SEAL ELECTRODE OF GLASS AND A METAL ALLOY
Jack F. Blum, Flint, Mich., assignor to General Motors Corporation, Detroit, Mich., a corporation of Delaware
Filed June 26, 1968, Ser. No. 740,335
Int. Cl. H01b *1/02;* H01t *13/02*
U.S. Cl. 313—136          9 Claims

ABSTRACT OF THE DISCLOSURE

A hermetic ceramic-to-metal conductive glass seal for use in the centerbore of spark plug insulators and the like containing glass and either a tin alloy or an antimony alloy is disclosed. The tin alloy and the antimony alloy contain a metal taken from the group consisting of copper, iron, manganese and nickel. The glass seal contains 3 to 15 weight percent of either tin or antimony. A specific glass seal in accordance with this invention is formed from a composition which contains 40 weight percent glass powder, 8 weight percent tin powder and 52 weight percent copper powder.

---

This invention relates to an improved ceramic-to-metal conductive glass seal for spark plugs and the like.

It is common practice in the spark plug art to form a part of the center electrode conductive path which extends through the insulator of a fused mass of glass and conductive material which bonds to the ceramic, the center electrode and the terminal screw, thereby forming an electrically conductive hermetic seal. Such seals are shown, for example, by U.S. Pats. 2,106,578, issued to Karl Schwartzwalder and William Shuford Kirk, and 2,248,415, issued to Karl Schwartzwalder and Alexander S. Rulka. The latter patent discloses a seal consisting of about 50% copper powder and 50% glass. The composition which is presently most commonly used for conductive glass seals in high production automotive-type spark plugs consists of about 58% copper and 42% glass. In practice a seal of this type is formed by first positioning the metal center electrode in the lower part of the insulator centerbore, injecting into the centerbore over the top of the centerbore electrode a charge of the metal-glass seal mixture in powder form, inserting a metal terminal screw into the centerbore and then heating so as to cause the glass seal mixture to soften while simultaneously pressing down on the terminal screw. In this manner pressure is applied to the softened glass material to cause it to densify and to bond to the insulator, the center electrode and the terminal screw. It has been found that the application of pressure to the seal while it is in the softened condition is essential for the reasons indicated, i.e., to assure non-porosity and good bonding. However, by reason of such pressure having been applied, the finished hardened seal is in something of a stressed condition and if the seal is reheated to a certain temperature, it will rapidly expand and lose its sealing propties. The temperature to which the seal must be reheated to create such conditions is referred to as the "backup temperature" and is, of course, characteristic of the particular seal composition used. The fact is, however, that for all glass sealing compositions heretofore known, for example those shown in the aforementioned prior patents, the backup temperature is very much lower than the temperature to which the sealing material must be initially heated in order to cause softening during manufacture. As a typical example, the sealing material mixture consisting of 58% copper powder and 42% borosilicate glass power presently in common use requires heating to 1500–1600° F. to cause softening during processing, and the seal so formed has a backup temperature of 1250–1350° F. This can be a problem since under severe operating conditions or improper plug installation, the temperature at the location of the seal can reach a temperature higher than 1350° F. thereby causing a permanent failure of the seal. It is a relatively simple matter, of course, to formulate a seal composition with a somewhat higher initial softening temperature and with a commensurately somewhat higher backup temperature. However, it is not a satisfactory solution to the problem for the reason that the metal parts involved cannot tolerate processing temperatures much in excess of 1700° F. and it would be prohibitively expensive to make such parts of a more resistant metal.

It is a primary object of this invention to provide a hermetic conductive glass seal which is operative at temperatures above 1450° F. without initially heating the seal mixture above 1600° F. It is another object of this invention to provide a seal which is operative at temperatures above 1450° F. which can be formed at low cost utilizing standard spark plug manufacturing techniques.

These and other objects are accomplished by a conductive metal glass seal containing a tin alloy or an antimony alloy. The composition of the conductive metal glass seal consists essentially of 30 to 45 weight percent glass and 55 to 70 weight percent of a tin alloy or an antimony alloy containing a metal taken from the group consisting of copper, iron, manganese and nickel. The amount of tin or antimony in the glass seal is 3 to 15 weight percent. When a spark plug containing the composition described above is heated and pressed with a terminal screw at a seal temperature of between 1500 and 1600° F., the resulting fused mass forms a hermetic conductive glass seal which is durable and operative at a temperature ranging from 1450° F. to above 1750° F., a temperature which is seldom exceeded at seal location during spark plug operation even under severe operating conditions.

Other objects and advantages of this invention will be apparent from the following detailed description, reference being made to the accompanying drawing wherein a preferred embodiment of this invention is shown.

Referring now to the drawing, the spark plug 10 comprises a conventional outer metal shell 12 having a ground electrode 14 welded to the lower end thereof. Positioned within the metal shell 12 and secured in the conventional manner is an insulator 16. The ceramic insulator 16 should preferably be of a high alumina base material containing upwards of 85% aluminum oxide such, for example, as covered by U.S. Pat. 2,760,875, issued to Karl Schwartzwalder and Helen Blair Barlett. Such an insulator has excellent mechanical strength and heat shock resistance along with the ability to form an excellent bond with glass, all these characteristics being of considerable advantage in forming the conductive seal of this invention. The insulator 16 is formed with a centerbore having a lower portion 18 of relatively small diameter, and an upper portion 20 of larger diameter which are connected by insulator centerbore ledge 26. Positioned in the lower portion 18 of the insulator centerbore is the center electrode 22. The center electrode 22 has an enlarged head 24 at the upper end thereof which rests on the insulator centerbore ledge 26 and a serrated lower end 28 thereof projecting beyond the lower tip of the insulator 16. Positioned in the upper portion 20 of the insulator centerbore is the terminal screw 32. A metal-glass seal 30 forms a hermetic conductive seal in the insulator centerbore portion 20. The conductive metal-glass seal 30 is bonded to the center electrode head 24, the terminal screw 32 and the inner walls of the ceramic insulator to provide an electrically conductive path from the terminal screw 32 to the center electrode 22 and to provide a hermetic seal in the insulator centerbore portion 20.

In accordance with the present invention the metal-glass seal 30 is a dense fused mass of glass and either a tin alloy or an antimony alloy consisting essentially of 30 to 45 weight percent glass and 55 to 70 weight percent metal alloy. The tin alloys and the antimony alloys contain a metal taken from the group consisting of copper, iron, manganese and nickel. The concentration of the tin or antimony in the seal should be 3 to 15 weight percent of the seal mass in order to form an alloy which enables the glass seal to have a high backup temperature, for example, in the range of 1450° to above 1750° F. The concentration of the glass is 30 to 45 weight percent with the preferred concentration being about 35 to 40 weight percent. The concentration of the metal alloy formed is between 55 to 70 weight percent in order to obtain a seal with a resistance of about one and one-half ohms, the resistance commonly used in spark plug seal systems.

It has been observed that the formation of certain metal alloys in a glass seal during the formation of the glass seal results in a conductive glass seal having a relatively high backup temperature, for example, in the range of 1450° to above 1750° F. One of the metal powders in the glass seal mixture composition is either tin or antimony, metals which have a relatively low melting point of 450° F. and 1166° F., respectively. During the heating step, when the glass is softened at temperatures between 1560 and 1600° F., these metals are melted and become liquid. The liquid or molten metal, for example, tin, wets the metal powder having a high melting point, for example, copper, and diffuses into the copper powder. This wetting and diffusion process results in the formation of a metal alloy, for example, in this case, a tin-copper alloy which has a melting point that is higher than the melting point of copper. As a result, the backup temperature of the conductive glass seal having the tin-copper alloy therein is higher, for example, 1500° F., than a comparable seal having copper therein which is 1250 to 1350° F.

The glass seal contains 3 to 15 weight percent of the metal having a low melting point. This quantity of low melting metal is sufficient to form an alloy with a high melting point metal such that the resultant metal alloy has a melting point higher than the high melting metal.

The glass in the metal-glass seal is the conventional borosilicate-type glass commonly known as Pyrex, which is presently being used in the production of automotive spark plugs. The composition of a preferred borosilicate glass is 65% by weight $SiO_2$, 23% by weight $B_2O_3$, 5% by weight $Al_2O_3$ and 7% by weight $Na_2O$. This glass will be hereafter referred to as glass A. Other glass frit compositions may be used in the seal as long as they soften at a temperature between 1560 and 1600° F. The composition of the glass in the metal-glass seal is not critical. The preferred glass concentration range is from about 35 to 40 weight percent. The mesh size of the glass powder does not appreciably affect the performance of the seal, a mesh size of 200 for the glass powder was found to be satisfactory.

Another component which may be added if desired in the metal-glass seal composition is a binder. A small amount of organic binder such as hydrogenated cottonseed oil may be admixed with the powder and the mixture then compressed into a self-sustaining pellet which will serve as a convenient manner of inserting the desired amount of powdered mixture into the insulator centerbore. The organic binder, of course, decomposes and goes off as a gas during the heating and pressing operation. The amount of binder in the mixture ranges from 1 to 3%. Other binders which may be used are carboxyl methyl cellulose, 1201 wax, dextrin, and the like.

A preferred embodiment of the present invention is a glass seal mixture having a composition of 52 weight percent copper powder, 8 weight percent tin and 40 weight percent glass A. This metal-glass powder mixture is mixed with 1 part hydrogenated cottonseed oil, wetted with a dextrin solution and then placed in the insulator centerbore and tamped. The metal terminal screw is then placed into the centerbore and the glass seal mixture heated to a temperature of 1500° F. to 1600° F. As the glass seal mixture is softened, the terminal screw is pressed down into the soft glass seal mixture. Upon cooling, a hermetic conductive seal is formed. This seal has to be reheated to a temperature above 1500° F. before it loses its sealing properties; that is, the backup temperature of this seal is 1500° F. As mentioned earlier, the backup temperature of a typical metal-glass seal presently being used in automotive spark plugs containing 58% copper and 42% borosilicate glass is of the order of 1300° F.

Other embodiments of the present invention are tabulated in the table below. These conductive metal-glass seal mixtures contain 40.0 weight percent glass, 8.0 weight percent metal having a low melting point and 52 weight percent metal having a high melting point. These conductive seals are formed by the same method as described for the preferred embodiment. All of the conductive metal-glass seals listed in the table have a backup temperature in the range of 1450° F. to above 1750° F.

| Example No. | Metal powder Low melting point, °C. | Metal powder High melting point, °C. | Backup temp., °F. |
|---|---|---|---|
| 1 | Tin, 232 | Copper, 1,083 | 1,500 |
| 2 | do | Nickel, 1,455 | 1,450 |
| 3 | do | Iron, 1,535 | 1,700 |
| 4 | do | Manganese, 1,260 | >1,750 |
| 6 | Antimony, 630 | Copper, 1,083 | 1,450 |
| 5 | do | Nickel, 1,455 | 1,450 |
| 7 | do | Iron, 1,535 | 1,600 |
| 8 | do | Manganese, 1,260 | >1,750 |

While the invention has been described in terms of specific examples, it is to be understood that it is not limited thereby except as defined in the following claims.

What is claimed is:

1. The combination of a fused glass mass and a ceramic insulator centerbore wall wherein the fused glass mass cooperates with the wall to form an electrically conductive hermetic seal in said centerbore, said fused glass mass consisting essentially of 30 to 45 weight percent glass and 55 to 70 weight percent of a metal alloy taken from the group consisting of tin alloys and antimony alloys, said tin alloys and said antimony alloys containing a metal taken from the group consisting of copper, iron, manganese and nickel, said fused mass containing 3 to 15 weight percent of a metal taken from the group consisting of tin and antimony, said seal adapted to operate at temperatures ranging from 1450° F. to above 1750° F.

2. The combination as described in claim 1 wherein said seal contains a tin-copper alloy.

3. A combination as described in claim 1 wherein said seal contains an antimony-copper alloy.

4. A sealing composition for forming an electrically conductive hermetic seal in a ceramic insulator at a temperature of 1600° F. or below, said seal adapted to operate at temperatures ranging from 1450° F. to above 1750° F., said sealing composition containing 30 to 45 weight percent glass and 55 to 70 weight percent of a metal powder mixture taken from the group consisting of tin powder mixtures and antimony powder mixtures, said tin powder mixture and said antimony powder mixture containing a metal powder taken from the group consisting of copper, iron, manganese and nickel, said sealing composition containing 3 to 15 weight percent of a metal powder taken from the group consisting of tin and antimony.

5. A sealing composition as described in claim 4 wherein said metal powder mixture contains tin and copper powder.

6. A sealing composition as described in claim 4 wherein said metal powder mixture contains antimony and copper powder.

7. A spark plug comprising a ceramic insulator having a centerbore therethrough, a metal member in said centerbore, and a dense fused electrically conductive mass bonded to said metal member and bonded to said ceramic insulator to form a hermetic seal in said centerbore, said hermetic seal adapted to operate hermetically at temperatures ranging from 1450° F. to above 1750° F., said mass consisting essentially of 30 to 45 weight percent glass and 55 to 70 weight percent of a metal alloy taken from the group consisting of tin alloys and antimony alloys, said tin alloys and said antimony alloys containing a metal taken from the group consisting of copper, iron, manganese and nickel, said fused mass containing 3 to 15 weight percent of a metal taken from the group consisting of tin and antimony.

8. A spark plug as described in claim 7 wherein said mass contains a tin-copper alloy.

9. A spark plug as described in claim 7 wherein said mass contains an antimony-copper alloy.

References Cited

UNITED STATES PATENTS

| 2,798,980 | 7/1957 | Beardslee | 313—118 X |
| 3,226,342 | 12/1965 | Kesten | 252—503 |
| 3,247,132 | 4/1966 | Schurecht et al. | 252—514 |
| 3,348,091 | 10/1967 | Abdella | 313—136 |

JAMES W. LAWRENCE, Primary Examiner

E. R. La ROUCHE, Assistant Examiner

U.S. Cl. X.R.

252—513; 313—144